C. R. DEMOLE.
SUSPENSION DEVICE FOR ELECTRIC TRACTION MOTORS.
APPLICATION FILED MAY 23, 1922.
1,425,454.
Patented Aug. 8, 1922.
2 SHEETS—SHEET 1.
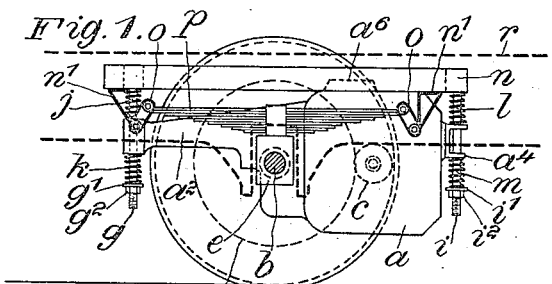
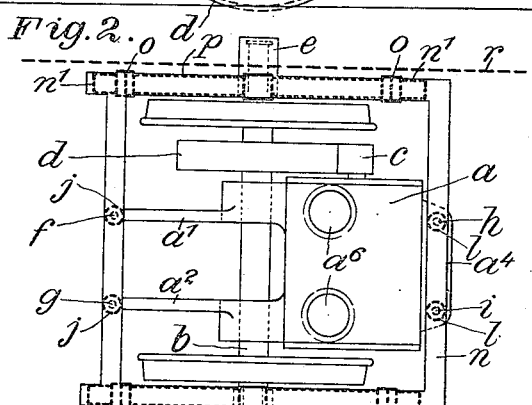
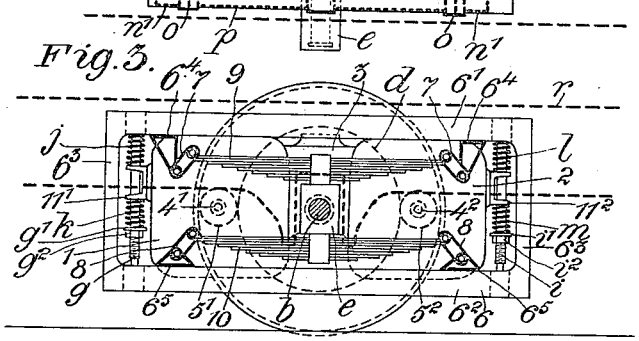
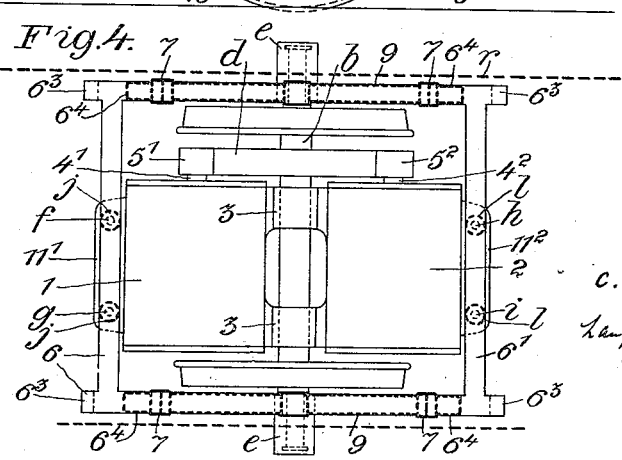
Inventor:
C. R. Demole

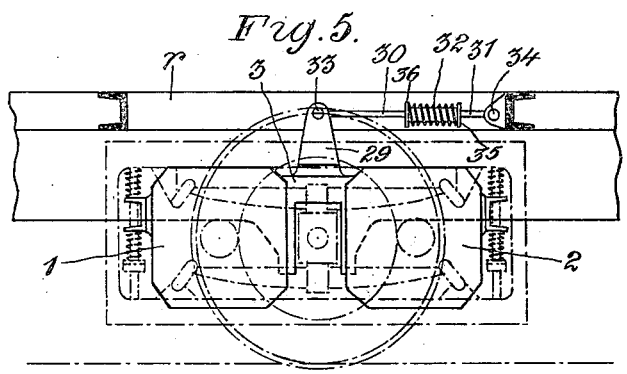
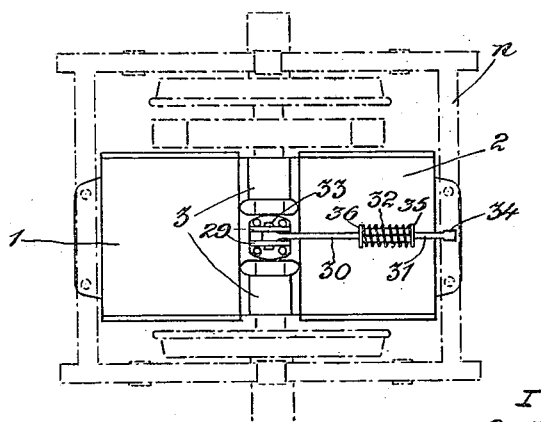

UNITED STATES PATENT OFFICE.

CHARLES ROGER DEMOLE, OF GENEVA, SWITZERLAND.

SUSPENSION DEVICE FOR ELECTRIC TRACTION MOTORS.

1,425,454.

Specification of Letters Patent. Patented Aug. 8, 1922.

Application filed May 23, 1922. Serial No. 563,115.

*To all whom it may concern:*

Be it known that I, CHARLES ROGER DEMOLE, engineer, a citizen of Switzerland, residing at Geneva, Canton of Geneva, in the Confederation of Switzerland, have invented certain new and useful Improvements in Suspension Devices for Electric Traction Motors, of which the following is a specification.

The object of this invention is an improved device for suspending motors used in electrically propelled vehicles.

The electric traction motors working on an axle by means of a suitable gearing are usually fixed on the one part onto either the said axle or a hollow shaft surrounding the same without the intermediary of any elastic member by means of lugs provided with bearings for receiving the axle or the shaft, and on the other part onto the truck or the bogie of the vehicle by means of elastic suspension members such as springs. In this way about half of the motor weight is supported directly by the bushes of the axle or the hollow shaft. The wear of these bushes is due to a considerable extent to the sum of the following two effects:

1st: The friction resulting from the weight of the axle or the shaft supported by the bushes;

2nd: The often rather heavy blows which result owing to this weight when the vehicle is rolling over rail joints or other unevennesses of the track or road.

According to the invention this wear is avoided due to the fact that the suspension device comprises an intermediate frame resting by means of springs upon the axle boxes and supporting the motor, said springs being adjusted in such a manner that their tension counterbalances the force acting on the bushes by which the motor is connected to the shaft which it rotates, and which force is caused by the weight of the motor, the described arrangement serving to reduce the wear of said bushes and to render the suspension independent from the frame of the vehicle, whilst allowing to suspend the total weight of the motor on springs.

The attached drawing illustrates by way of example and diagrammatically two working forms of the invention. Figs. 1 and 2 are an elevational and plan view, respectively, of a first working form adapted for the suspension of a single motor and Figs. 3 and 4 show equally in elevation and in plan a second working form for suspending a twin motor.

Figs. 5 and 6 are an elevation and plan view, respectively, showing the application of an anchoring device to the twin motor construction shown in Figs. 3 and 4.

According to Figs. 1 and 2 the single traction motor $a$ of the usual octagonal shape is working directly upon the axle $b$ by a pinion $c$ and by a toothed wheel $d$ fixed rigidly upon the axle. On the one side of the axle $b$ the motor is provided with two long and parallel shanks $a^1$, $a^2$ carrying the axle bearings. On the opposite side of said axle the motor is provided with lugs $a^4$. The extremities of the shanks $a^1$, $a^2$ and the lugs $a^4$ have holes for the passage of vertical rods $f$, $g$, $h$ and $i$ upon which are positioned the coiled springs $j$, $k$, $l$, $m$. The springs $j$ and $l$ bear at one extremity against the rectangular intermediate frame $n$ arranged above the axle $b$ and the springs $k$ and $m$ bear at one extremity against washers $g'$ and $i'$ held on the rods by screw nuts $g^2$ and $i^2$. The frame $n$ rests on the axle journal boxes $e$ by means of supports $n^1$, links $o$, and leaf springs $o$ whose flexibility is due rather to their length than to the cross section which they are given.

The motor $a$ is on its top surface provided with two projections $a^6$ whose axes are in the vertical plane through the center of gravity of the mass constituted by the motor and the intermediate frame. These projections are adapted to serve as supports for an anchoring device similar to that shown in Figs. 5 and 6.

The described form of the suspension device according to Figs. 1 and 2 operates as follows:

Owing to the screw nuts $g^2$, $i^2$ which may be displaced on the rather long, threaded portion of the rods $f$, $g$, $h$ and $i$, it is possible to vary the tension or stress of the springs $j$, $k$, $l$, $m$ within large limits, which stress is taken up by the said screw nuts and the laminated springs $p$.

The tension of the springs $j$, $k$, $l$, $m$ arranged in pairs on each one of the rods $f$, $g$, $h$, and $i$ may be adjusted in such a manner that the portion of the weight which in the known suspension devices would have to be supported by the axle bushes is taken up by a force acting in the inverse or upward direction. If said force counterbalances this respective portion of the motor weight, the pressure of the axle bearing on the axles becomes zero as well as the friction due to such pressure. The shocks or blows caused by the unevenness of the track or road are, however, transmitted to the bearings. If the active force is double that of the weight of the particular portion of the motor which in other motor suspensions would bear on the axle bushes, a pressure will result on the axle bearings which is equal to the said weight, but which is directed upwardly.

In this second case the wear of the bushes due to the friction resulting from this pressure will be equal to that mentioned above but the wear instead of affecting the top part of the bushes, will affect their lower part. The unevennesses of the track or road do however not give rise to shocks or blows of the motor and of the axle bushes on the axle. They will on the contrary cause a transitory reduction of the upwardly directed pressure of the axle bushes on the axle. It is to be noted that except in some rare cases, these shocks or blows will by no means be able to cause a momentary reduction down to zero of the pressure of the motor underneath the axle since the energy which they represent is immediately taken up by the springs. For this reason it is not necessary to stress the springs to such a degree as has been necessary in the second case. The wear of the inner part of the axle bushes may therefore be brought down to a value which is very much smaller than that which would correspond to the wear of the upper part of the axle bushes of a motor suspended in the usual way. Nevertheless a great majority of the blows will not be transmitted to the axle bushes and those which are so violent that they are not entirely taken up by the springs will at any rate be considerably damped or absorbed.

From the above it becomes evident that the wear of the axle bushes will be no longer due to the sum of the two causes mentioned in the first part of this specification, but will be equal to their difference, which by means of suitable adjusting might theoretically be brought down to a value near zero. This latter value is dependent first of all upon the speed of the vehicle and the state of the track or road, which two factors determine the violence of the blows or shocks. The tension of the springs should therefore be adjusted before taking up the service on a given line or route in accordance with that required for the first vehicle of each particular type. It is preferable to choose the tension definitely a little higher than would correspond to the value determined by the trials, for the simple reason that whilst the friction in the bushes only causes a wear in them, the sudden and violent blows have the great inconvenience that the electric insulations inside the motor are often damaged and certain parts of the motor get out of order.

Owing to the new suspension device, the whole motor weight is suspended on springs and the axle is the only part of the vehicle which is not yieldingly suspended. The whole of this weight is besides transmitted to the axle boxes which may stand a much greater wear than the axle bushes without requiring a revision and which are much more easily accessible than the axle bearings.

Since the motor is suspended on the one part independently from the frame of the truck or from the vehicle bogie, and on the other part from the box of the vehicle, the vibrations which may occur are localized and will be transmitted neither to this truck or bogie, nor to the vehicle box. Hence the noise caused by such vibrations owing to the resonance of the box will largely be reduced.

The twin motor as shown in Figs. 3 and 4 comprises two like parts 1, 2 symmetrically arranged on both sides of the axle, and which are united by ribs 3 cast in one piece with the casings; the armatures of the motors are keyed on to shafts $4^1$, $4^2$. The latter carry pinions $5^1$, $5^2$ which in two opposite points engage with a wheel $d$ which is common to both and is keyed onto the axle $b$. The geometrical axes of the shafts $4^1$, $4^2$ and of the axle $b$ are normally in the same horizontal plane. The axle bushes of the motor are rigidly fixed onto the ribs 3.

The intermediate frame 6 consists, in this working form, of two horizontal rectangular frames $6^1$, $6^2$ arranged, respectively, above and below the axle $b$, and connected at their corners by the uprights $6^3$. The intermediate frame 6 is connected by the supports $6^4$, $6^5$ the links 7, 8 and the plate-springs 9, 10 to the axle boxes $e$ on both sides of which are arranged the springs 9, 10 of each pair. Between the rectangular frames $6^1$, $6^2$ are arranged the vertical rods $f, g, h, i$, onto which the coiled springs $j, k, l,$ and $m$ are arranged acting by pairs on the lugs $11^1$, $11^2$ which are provided on each side of the motor 1—2. The tension of these springs may be adjusted, the same as in the case of the first working form, by means of washers $g^1$, $i^1$ and screw nuts $g^2$, $i^2$ which the rods $f, g, h, i,$ are fitted with.

The suspension springs may of course be arranged also in another manner than the one shown in Figs. 3 and 4.

Since the two pinions $5^1$, $5^2$ of this twin motor engage the wheel $d$ in an inverse direction in two diametrically opposed points, a torque will be produced whose axis of rotation is the axis of the axle $b$ and which does not give rise to a reaction on the axle bushes. Hence a good deal of the play is avoided which is caused by the wear of these axle bushes. It is now allowable to provide for a slight vertical play of the wheel $d$ between the pinions $5^1$, $5^2$ and instead of fixing the axle bushes rigidly on the ribs 3 to give them a very slight play in vertical slides arranged below these ribs, whilst otherwise the engagement of the teeth is maintained even more precise than in the case of the play which one had to take account of up to now for the reason of the usual wear of the axle bushes. Between the ribs and the axle bushes springs are inserted. The vertical play provided for never intervenes except in the case of exceptional blows and only for very short intervals. It will nevertheless function to stress the springs $j, k, l$ and $m$ less and to reduce even more the slight wear which said tension or stress might otherwise produce. It comes in fact to this that the function of the axle bushes becomes that of mere guiding members.

The entire weight of the twin motor rests by the intermediary of springs on the axle boxes in such a manner that the anchoring device, which will now be described, will transmit horizontal strains only.

Referring to Figs. 5 and 6, a pair of spaced vertical lugs 29 are fixed at their lower ends to the casing of the motors 1 and 2 between the connecting ribs 3. A rod 30 is journalled at one end between the upper portions of said plates upon a pin 33 and at its other end is formed with a head 35. A second rod 31 is journalled at one end to the vehicle frame $r$ upon a pin 34 and at its other end is formed with a head 36. The rods 30 and 31 are arranged in overlapping relation between the heads 35 and 36, the rod 30 passing through the perforation in the head 36 and the rod 31 passing through a perforation in the head 35. A coil spring 32 surrounds the rods 30 and 31 between the heads 35 and 36 and is fixed at its ends to said heads. The parts 29 to 36, inclusive, form a yielding anchoring device between the motors 1 and 2 and the vehicle frame $r$ which transmits only horizontal stresses. As already stated, similar anchoring devices may be provided between the motor $a$ of Figs. 1 and 2 and the frame $r$. It is to be understood that the anchoring device may be of any other suitable construction than the one shown by way of example in Figs. 5 and 6.

An important advantage of the second working form resides in the fact that the center of gravity of the mass comprising the twin motor and the intermediate frame is essentially in the axis of the axle $b$. For this reason the moment of the mass on this axis is practically zero. Owing to the fact, that the springs which support the motor weight and which damp and absorb the vertical swings due to this weight, are absolutely independently from the springs which damp or absorb the sudden variations of the tractive effort of the motor, the two groups of springs being operative in directions perpendicular one to the other—it follows that the vehicle runs more regularly and more smoothly since the energy represented in these swings is not suddenly added to or is not suddenly subtracted from this tractive effort, which would cause a jerking run and often even longitudinal trepidations of the vehicle. In fact the suppression of the sudden variations of the effort transmitted to the axle essentially improves also the working conditions for the armatures and the gearings.

The twin motor may advantageously be made use of for locomotives but owing to its low and elongated form in the direction of the length of the vehicle it may be particularly adapted for automobile railway cars and for tramways.

In both the working forms shown, the motor drives the axle directly by means of an intermediary gear. It could also be provided that the drive is not direct but is obtained by a hollow shaft which by means of a gear is rotated, said hollow shaft surrounding the axle. In this case the intermediate frame would bear on the axle boxes and the springs would be adjusted in such a way that their tension would counterbalance the force caused by the motor weight and acting on the bearings by which the motor is connected with the hollow shaft. The use of such a hollow shaft which allows a certain displacement of the axle with regard to the motor, may be of advantage. The displacement of axle within the shaft is reduced to a minimum since it does correspond solely to the displacement of the motor and no longer to the sum of the several displacements of the whole vehicle with regard to the axle.

The suspension device might in the case of a single motor (Figs. 1 and 2) also comprise an intermediate frame with two superposed frames, the same as it might be made of a single frame in the case of the twin motor (Figs. 3 and 4).

The springs inserted between the intermediate frame and the motor might also be omitted.

Having now particularly described and ascertained the nature of my invention and the manner in which it is to be performed, I declare that what I claim is:—

1. A suspension device for electric traction motors comprising in combination an intermediate frame bearing on the axle boxes by means of springs and supporting the motor, the connecting means between the motor and its supporting frame comprising springs which are adjustable in such a manner that their tension is adapted to counterbalance the force acting on the bearings by which the motor is connected to the shaft which it drives, and which force is due to the weight and torque of the motor, whereby to diminish the wear of the bushes of said bearings.

2. A suspension device for twin electric traction motors comprising in combination an intermediate frame bearing on the axle boxes and supporting the motors, the connecting means between the motors and their supporting frame comprising springs which are adjustable in such a manner that their tension is adapted to counterbalance the force acting on the bearings by which the motors are connected to the shaft which they drive, and which force is due to the weight and torque of the twin motors, whose two armatures engage in two points, which normally are diametrically opposite one to another, by means of pinions with a common toothed wheel fixed rigidly to the axle.

3. A suspension device for electric traction motors comprising in combination an intermediate frame bearing on the axle boxes and supporting the motor, the connecting means between the motor and its supporting frame comprising springs which are adjustable in such a manner that their tension is adapted to counterbalance the force acting on the bearings by which the motor is connected to the shaft which it drives, and which force is due to the weight and torque of the motor and an anchoring device adapted to connect the motor to the vehicle chassis in such a manner that only horizontal strains are transmitted.

4. A suspension device for electric traction twin motors comprising in combination an intermediate frame bearing on the axle boxes and supporting the motors, the connecting means between the motors and their supporting frame comprising springs which are adjustable in such a manner that their tension is adapted to counterbalance the force acting on the bearings by which the motors are connected to the shaft which they drive, and which force is due to the weight and torque of the twin motors, the center of gravity of the mass of the motors and intermediate frame being arranged substantially in the axis of the axle, so that the weight moment of said mass with regard to the axle is practically zero.

5. A suspension device for electric traction motors comprising in combination an intermediate frame bearing on the axle boxes by means of springs and supporting the motor, the connecting means between the motor and its supporting frame comprising springs which are adjustable in such a manner that their tension is adapted to counterbalance the force acting on the bearings by which the motor is connected to the shaft which it drives, and which force is due to the weight and torque of the motor, the springs by which the intermediate frame is made to bear on the axle boxes and the springs which support the tractive effort of the motor being made to work independently from one another.

In testimony whereof I have affixed my signature in presence of two witnesses.

CHARLES ROGER DEMOLE.

Witnesses:
DR. ROD. DE WHORTEINBERG,
EDM. EUNNANNE.